United States Patent Office 3,787,516
Patented Jan. 22, 1974

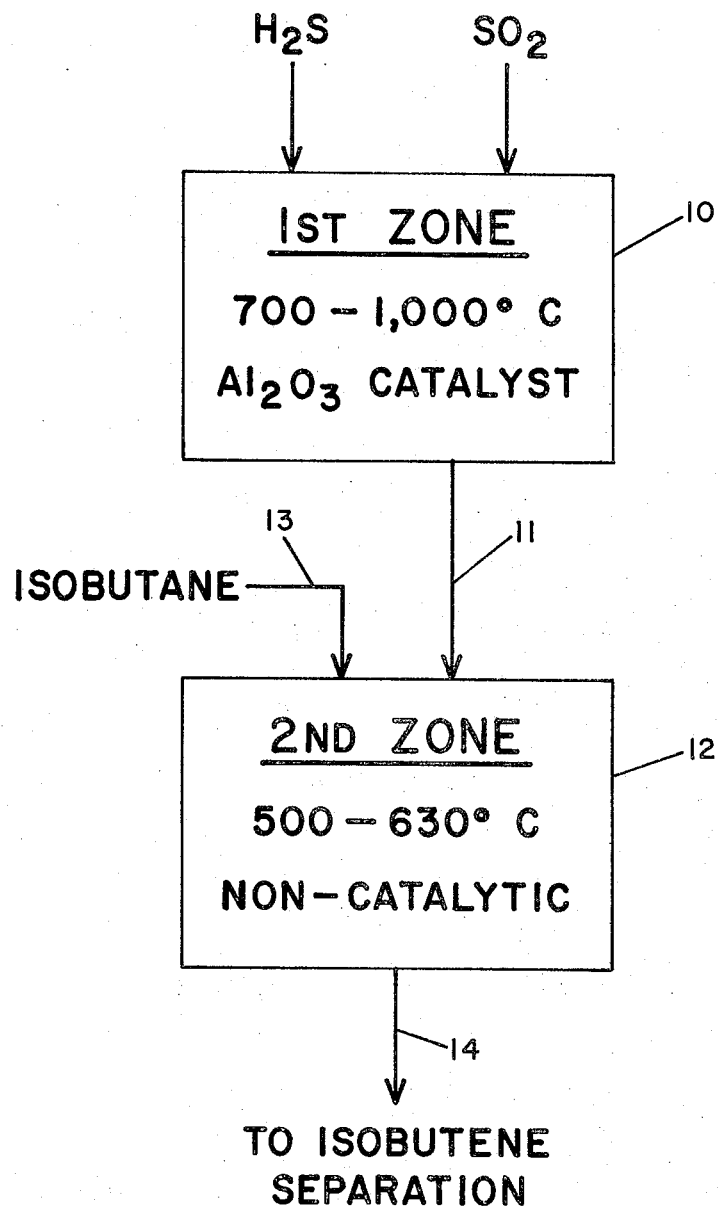

3,787,516
CONVERSION OF ISOBUTANE TO ISOBUTENE
Roger M. Bean, Glen Mills, Pa., assignor to Sun Research and Development Co., Philadelphia, Pa.
Filed Sept. 28, 1972, Ser. No. 293,193
Int. Cl. C07c 5/20
U.S. Cl. 260—683.3          7 Claims

ABSTRACT OF THE DISCLOSURE

Isobutane is dehydrogenated to produce isobutene by establishing in a first zone a dehydrogenating agent consisting essentially of sulfur at 700–1000° C. and then directly contacting same non-catalytically in a second zone at 500–630° C. with isobutane. Establishment of the dehydrogenating agent can be done either by catalytically reacting $SO_2$ and $H_2S$ at 700–1000° C. or by heating sulfur to 700–1000° C.

BACKGROUND OF THE INVENTION

This invention relates to the conversion of isobutane to isobutene by reaction at elevated temperature with a dehydrogenating agent.

Numerous references in the prior art disclose the use of sulfur-containing dehydrogenating agents for converting hydrocarbons to olefinic products at elevated temperatures. For example, an article by C. R. Adams, J. of Cat., 11, 96–112 (1968) and references cited therein show the dehydrogenation of isobutane and other hydrocarbons by reaction with sulfur dioxide at high temperatures, such as 500–600° C., in the presence of various catalysts. The use of a combination of oxygen and various sulfur-containing compounds such as $H_2S$ and $SO_2$, or a combination of $H_2S$ with $SO_2$ or $SO_3$, for effecting dehydrogenation reactions in the presence of catalysts is described in the following United States patents:

2,971,035, R. F. Stringer et al., Feb. 7, 1961
3,403,192, M. Vadekar et al., Sept. 24, 1968
3,585,249, A. D. Cohen et al., June 15, 1971

The use of sulfur as the agent for dehydrogenating hydrocarbons at elevated temperatures is disclosed in the following United States patents:

3,110,741, S. H. Patinkin et al., Nov. 12, 1963
3,247,278, W. E. Garwood et al., Apr. 19, 1966
3,585,250, I. S. Pasternak et al., June 15, 1971

Of this group only the Patinkin et al. patent contemplates carrying out the dehydrogenation reaction in the absence of a catalyst.

An article by H. E. Rassmussen et al., Ind. Eng. Chem., 38, 376,382 (1946) describes the non-catalytic reaction of sulfur with various hydrocarbons including isobutane. The procedure involved preheating separate streams of the hydrocarbbon and sulfur to a temperature of the order of 600° C., then mixing the streams and passing the mixture through a reaction zone maintained at an elevated temperature typically in the neighborhood of 650° C. and in the absence of any catalyst. Results reported in this article for dehydrogenating isobutane under these conditions show a conversion of about 23% with selectivity for isobutene production of about 65%.

SUMMARY OF THE INVENTION

The present invention constitutes an improvement over the procedure of the last-mentioned reference, whereby sulfur is utilized in a novel manner under non-catalytic conditions to secure a better conversion-selectivity relationship in the dehydrogenation of isobutane to isobutene.

It has now been found that if sulfur is first heated to or formed at a temperature in the range of 700–1000° C. in a first zone and then directly contacted in the absence of a catalyst with isobutane in a second zone maintained at 500–630° C., a distinct improvement in the conversion-selectivity relationship is achieved as compared to that obtained with the non-catalytic procedure of the prior art. The process of the invention thus comprises establishing in a first zone the dehydrogenating agent consisting essentially of sulfur at a temperature in the range of 700–1000° C., preferably 750–900° C., then directly admixing a stream of the sulfur with a stream of isobutane and passing the mixture through a second zone maintained at 500–630° C., preferably 525–575° C., and in the absence of catalyst to effect dehydrogenation, cooling the reaction mixture and recovering isobutene therefrom as product. Establishment of the dehydrogenating agent in the first zone can be effected either by catalytically reacting $SO_2$ and $H_2S$ at 700–1000° C. or by heating sulfur to 700–1000° C.

BRIEF DESCRIPTION OF THE DRAWING

The accompanying drawing is a schematic illustration of the process of the invention in an embodiment wherein the dehydrogenating agent is formed by reacting hydrogen sulfide and sulfur dioxide at high temperature.

DESCRIPTION

With reference now to the drawing, a first zone 10 is provided wherein sulfur is prepared by catalyzed reaction of hydrogen sulfide and sulfur dioxide at high temperature in accordance with the following equation:

$$4H_2S + 2SO_2 \rightarrow 3S_2 + 4H_2O$$

The hydrogen sulfide and sulfur dioxide can be fed as separate streams to zone 10 as indicated in the drawing and therein heated to the desired temperature level of 700–1000° C., preferably 750–900° C., and contacted with the catalyst. Alternatively the $H_2S$ and $SO_2$ can be admixed and the mixture can be pre-heated to any temperature up to the desired temperature and then contacted at 700–1000° C. with the catalyst in zone 10. The reaction of $H_2S$ and $SO_2$ to form sulfur at somewhat lower temperatures has been widely practiced in the Claus process utilizing alumina or bauxite as catalyst [see B. W. Gamson et al., Chem. Eng. Prog., 49(4): 203–215 (1953)], and the same kinds of catalyst can be utilized for the higher temperature reaction of the persent process.

An effluent stream comprising the desired dehydrogenating agents passes directly from zone 10 through line 11 to the second zone 12 wherein it is admixed with a stream of isobutane from line 13. The isobutane should be preheated sufficiently so that the resulting mixture of isobutane and dehydrogenating agent will be at a temperature in the range of 500–630° C., preferably 525–575° C. The dehydrogenating agent just prior to mixing with the isobutane can be at the same temperature as zone 10 or the effluent stream from line 11 can be cooled to a level within the range of 500–630° C. before admixing is effected. In the latter case it is desirable that the admixing occur immediately, e.g. within 10 seconds of the time the temperature of the effluent stream has dropped below 700° C., as a considerable time lapse before admixing the cooler effluent stream with the isobutane may result in reduced activity of the dehydrogenating agent.

The proportion of dehydrogenating agent to hydrocarbon should be such as to provide 0.1–5.0, more preferably 0.5–2.0, atoms of sulfur per molecule of isobutane. Low ratios of sulfur to isobutane tend to give high selectivities but low conversions. As this ratio is increased, the percent conversion tends to increase but selectivity concurrently drops.

Reaction in zone 12 between the isobutane and sulfur is effected in the absence of a catalyst merely by maintaining the temperature in the range of 500–630° C., preferably 525–575° C., and allowing sufficient residence time. The residence time in zone 12 can vary widely, with a generally useful range being 0.1–50 seconds and a more preferable range being 1–25 seconds. The pressure in the reaction zone conveniently can be about atmospheric although higher or lower pressures can be employed if desired. A small proportion of tar normally is formed in the reaction.

Under the foregoing conditions good conversion-selectivity relationships are obtained in dehydrogenating the isobutane to isobutene. Typical values are, for example, a selectivity of 90% at a conversion level of 25% or a selectivity of 67% at a conversion level of 45%. These values represent substantially more efficient operation than shown in the prior art for the non-catalytic conversion of isobutane to isobutene.

The reaction products pass from the second zone 12 through line 14 through cooling means to a fractional distillation system (not shown) to recover isobutene from the product. Unconverted isobutane can be separated from any lower and higher boiling materials formed during the dehydrogenation reaction and recycled for further conversion.

In an alternative embodiment of the process elemental sulfur is used in place of $H_2S$ and $SO_2$. The dehydrogenating agent in this variation is established merely by heating the sulfur in the first zone to a temperature in the range of 700–1000° C., preferably 750–900° C. If desired a mixture of steam and sulfur can be used, although this is not essential. The resulting dehydrogenation agent is then directly used in the second zone to effect conversion of the isobutane.

In each of the foregoing embodiments the dehydrogenating agent is established by first securing sulfur at a temperature level in the range of 700–1000° C. and then directly utilizing same for contacting isobutane non-catalytically at a temperature of 500–630° C. As previously pointed out, this results in a better conversion-selectivity relationship than is experienced when the sulfur is heated to or formed at approximately the same temperature level at which the isobutane conversion is effected. The reason for this improvement is not known with certainty but it is believed that it comes about because the higher temperature results in a form of sulfur having better activity, of which advantage is then taken by direct or immediate use of the active form at a lower temperature level that is optimum for the dehydrogenation reaction.

As specific illustrations of the invention, five runs were made in which sulfur was formed from $H_2S$ and $SO_2$ at about 850° C. and then directly reacted with isobutane at about 550° C. Streams of $H_2S$ and $SO_2$ in 2:1 molar proportion were admixed, and the mixtures were preheated and then contacted in a reactor tube with an eta alumina catalyst bed at about 850° C. A stream of the resulting dehydrogenating agent was directly passed to the top of another tubular zone containing no catalyst and maintained at about 550° C. and there admixed in selected proportions with a stream of isobutane. A stream of reaction product was continuously removed from the bottom of the tubular reactor. Table I presents data for each run after an on-stream period of 30 minutes.

TABLE I.—DEHYDROGENATION OF ISOBUTANE VIA SULFUR PREPARED FROM $H_2S$ AND $SO_2$

[Sulfur preparation temperature=850° C. Dehydrogenation temperature=550° C.]

| Run No. | S:isobutane ratio [1] | Residence time, seconds | Isobutane conversion, percent | Isobutene selectivity, percent | Percent tar |
|---|---|---|---|---|---|
| 1 | 1.1 | 6.0 | 24 | 91 | 1.1 |
| 2 | 1.4 | 7.0 | 26 | 89 | 1.2 |
| 3 | 1.4 | 6.6 | 31 | 88 | 2.3 |
| 4 | 1.7 | 7.2 | 33 | 87 | 4.4 |
| 5 | 3.7 | 6.6 | 43 | 62 | 8.6 |

[1] Atoms of sulfur/molecule of isobutane.

The data in Table I illustrate the effect of varying the sulfur:isobutane ratio. At the lower ratios high selectivity for isobutene production can be obtained with relatively low conversion. Higher conversion can be attained at increased ratios but the selectivity decreases. However the conversion-selectivity relationship is substantially better than that achieved by the prior art non-catalytic process, wherein a selectivity of only 65% was obtained at a conversion level of 23%.

Table II presents data for two comparative continuous runs made in the same apparatus and in the same general manner as Runs 1–5 using sulfur made from $H_2S$ and $SO_2$. Run 6 was made by reacting the $H_2S$ and $SO_2$ at about 600° C. and utilizing the resulting dehydrogenating agent also at about 600° C. In Run 7 the $H_2S$—$SO_2$ reaction was carried out at 850° C. and the resulting sulfur was then utilized for isobutane dehydrogenation at 600° C.

TABLE II

Isobutane dehydrogenations via sulfur formed at different temperature levels from $H_2S$ and $SO_2$

[Dehydrogenation temperature=600° C.]

| Run number | 6 | 7 |
|---|---|---|
| Sulfur preparation temperature, ° C | 600 | 850 |
| S : isobutane ratio [1] | 1.1 | 1.4 |
| Residence time, seconds | 15 | 6.6 |
| Isobutane conversion, percent | 30 | 48 |
| Isobutene selectivity, percent | 75 | 75 |

[1] Atoms of sulfur/molecule of isobutane.

As can be seen in Table II both runs gave the same selectivity under the respective conditions employed. However Run 7 in which the sulfur was prepared at the higher temperature level gave substantially higher conversion than Run 6, even though the residence time in the latter was considerably longer. These comparative data illustrate the improved results attainable with the present invention.

When runs are made essentially duplicating the foregoing except that the dehydrogenating agent is established by heating sulfur to the same temperature as used for the $H_2S$—$SO_2$ reaction, substantially equivalent results are obtained.

The invention claimed is:

1. Method of converting isobutane to isobutene which comprises:
    (a) establishing in a first zone a dehydrogenating agent consisting essentially of sulfur at a temperature in the range of 700–1000° C.;
    (b) directly admixing a stream of said dehydrogenating agent from the first zone with a stream of isobutane and passing the mixture in the absence of a catalyst through a second zone maintained at 500–630° C., whereby dehydrogenation of isobutane occurs;
    (c) cooling the reaction mixture from the second zone and recovering isobutene therefrom as product.

2. Method according to claim 1 wherein step (a) is effected by catalytically reacting $SO_2$ and $H_2S$ in said first zone at 700–1000° C.

3. Method according to claim 2 wherein the $H_2S$ and $SO_2$ are reacted at 750–900° C.

4. Method according to claim 3 wherein the temperature in said second zone is in the range of 525–575° C.

5. Method according to claim 1 wherein step (a) is effected by heating sulfur to 700–1000° C.

6. Method according to claim 5 wherein the sulfur is heated to 750–900° C.

7. Method according to claim 6 wherein the temperature in said second zone is in the range of 525–575° C.

References Cited

UNITED STATES PATENTS 3,586,732  6/1971  Guth et al. _____ 260—683.3

PAUL M. COUGHLAN, JR., Primary Examiner

V. O'KEEFE, Assistant Examiner